US006178655B1

(12) United States Patent
Potter et al.

(10) Patent No.: US 6,178,655 B1
(45) Date of Patent: *Jan. 30, 2001

(54) MARKING ATTACHMENT FOR MEASURING SYSTEM

(76) Inventors: Michael D. Potter, 1759 Beulah Rd., Churchville, NY (US) 14428; Kathleen M. Dever, R.R. 1 Box 273, Richmond, VT (US) 05477

( * ) Notice: Under 35 U.S.C. 154(b), the term of this patent shall be extended for 0 days.

This patent is subject to a terminal disclaimer.

(21) Appl. No.: 09/127,129

(22) Filed: Jul. 31, 1998

Related U.S. Application Data

(63) Continuation-in-part of application No. 08/849,253, filed on Aug. 16, 1996, now Pat. No. 5,829,152
(60) Provisional application No. 60/005,154, filed on Oct. 16, 1995.

(51) Int. Cl.[7] .............................. B25H 7/04; G01B 3/10
(52) U.S. Cl. ............................... 33/668; 33/768; 33/769; 33/761; 33/759; 33/42
(58) Field of Search ......................... 33/577, 579, 755, 33/666, 668, 759, 760, 761, 768, 770, 751, 39.1, 474, 479, 480, 41.1, 41.4, 41.6, 42, 44, 34, 35, 39.2, 669, 679, 342

(56) References Cited

U.S. PATENT DOCUMENTS

| | | | |
|---|---|---|---|
| 1,529,293 | 3/1925 | Beulwitz | 33/678 |
| 2,575,354 | 11/1951 | Mills | 33/767 |
| 2,581,858 | 1/1952 | Hilt et al. | 33/768 |
| 2,624,120 | 1/1953 | Mills | 33/668 |
| 3,205,584 | 9/1965 | Overaa | 33/760 |
| 3,731,389 | 5/1973 | King | 33/189 |
| 3,802,083 | 4/1974 | Freed | 33/138 |
| 4,015,337 | 4/1977 | Taylor | 33/138 |
| 4,296,554 | 10/1981 | Hammerstrom | 33/138 |
| 4,439,927 | 4/1984 | Elliott | 33/189 |
| 4,542,589 | 9/1985 | Yamamoto | 33/138 |
| 4,580,347 | 4/1986 | McKnight | 33/138 |
| 4,630,376 | 12/1986 | Pentecost | 33/138 |
| 4,667,412 | 5/1987 | Carlson | 33/138 |
| 4,700,489 | * 10/1987 | Vasile | 33/342 |
| 4,729,171 | 3/1988 | Samson | 33/138 |
| 4,827,622 | * 5/1989 | Makar | 33/770 |
| 4,965,941 | 10/1990 | Agostinacci | 33/668 |
| 5,416,978 | 5/1995 | Kaufman | 33/770 |
| 5,435,074 | 7/1995 | Holevas et al. | 33/668 |
| 5,477,619 | 12/1995 | Kearns | 33/668 |
| 5,809,662 | * 9/1998 | Skinner | 33/768 |
| 5,829,152 | * 11/1998 | Potter et al. | 33/668 |
| 6,041,513 | * 3/2000 | Doak | 33/668 |

FOREIGN PATENT DOCUMENTS

| 2172109A | 9/1986 | (GB) . |
|---|---|---|
| 63-212801 | 9/1988 | (JP) . |

* cited by examiner

Primary Examiner—Diego Gutierrez
Assistant Examiner—Yaritza Guadalupe
(74) Attorney, Agent, or Firm—Theodore R. Touw

(57) ABSTRACT

A marking attachment for attachment to a linear or angle-measuring system has a support, means for attaching the support to the measuring device, a marking element attached to the support for marking on a surface (the marking element having a predetermined height), and a resilient element whereby the marking element is maintained in a spaced-apart relationship to the surface until the support is moved in a direction substantially perpendicular to the surface to contact the surface with the marking material for marking the surface. The marking element preferably comprises a marking material including an oleate-based pigment ink for marking the surface. The resilient element for maintaining the marking element in a spaced-apart relationship to the surface preferably comprises a quantity of elastomeric material disposed adjacent to marking element, the quantity of elastomeric material having an uncompressed thickness greater than the height of marking element. The resilient element may have an aperture generally surrounding the marking element or may consist of two or more pieces disposed alongside the marking element. Various embodiments have features including a cursor aligned with the marking element and/or including a modular, removable, and replaceable marking element. Any combination of the attachment's support, means for attaching, marking element, and resilient element may be made removable and replaceable.

33 Claims, 5 Drawing Sheets

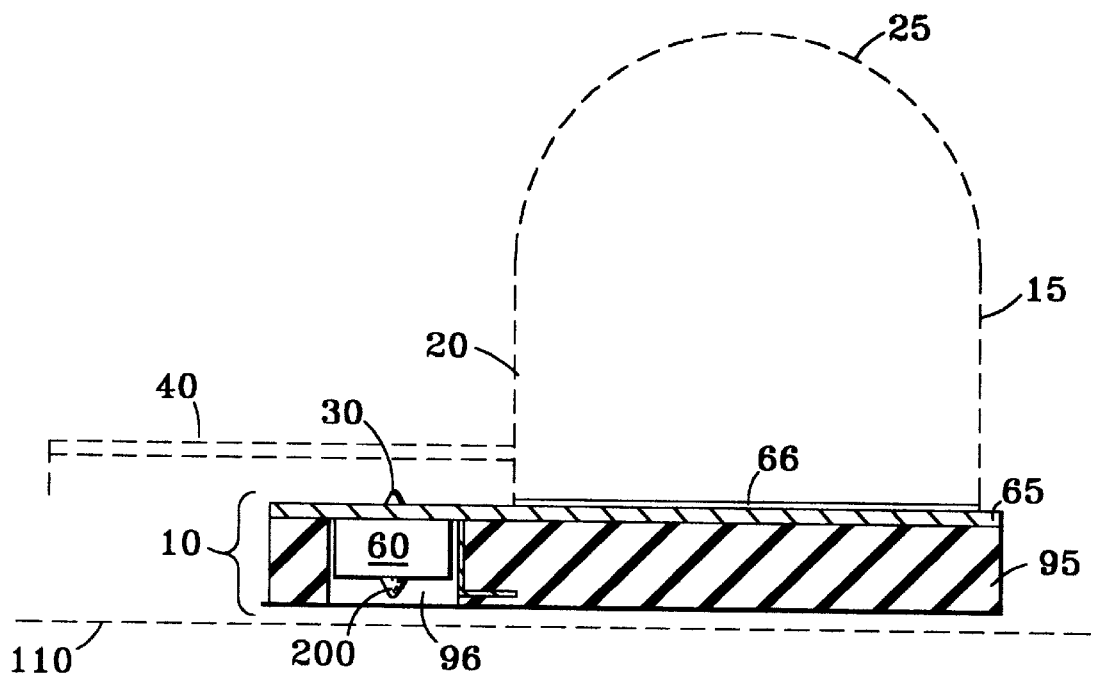
FIG. 5a
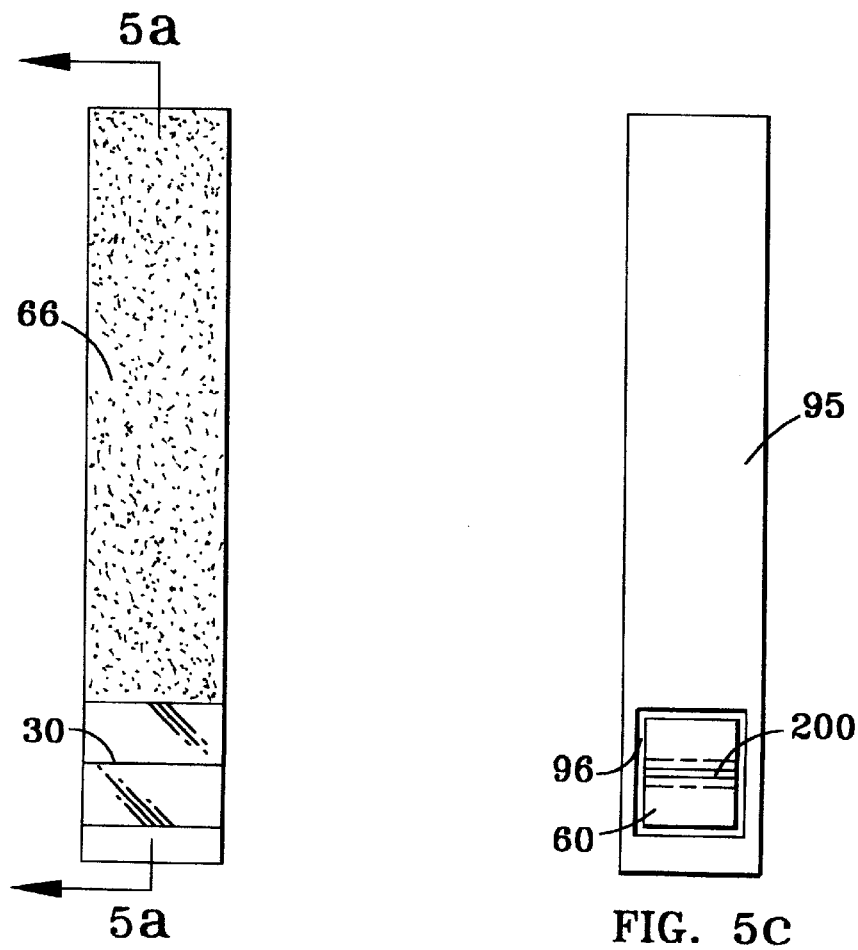
FIG. 5b
FIG. 5c

MARKING ATTACHMENT FOR MEASURING SYSTEM

This application is related to U.S. Provisional Patent Application Ser. No. 60/005,154 titled "Meter Mark Measuring and Marking System" filed on Oct. 16, 1995, and is a continuation-in-part of U.S. patent application Ser. No. 08/849,253 filed Jan. 29, 1997, now U.S. Pat. No. 5,829,152, which is a national stage application from PCT Application Ser. No. PCT/US96/13385 filed Aug. 16, 1996.

TECHNICAL FIELD OF THE INVENTION

This invention relates generally to measuring instruments and marking devices. More particularly, it relates to marking apparatus for attachment to a measuring instrument to mark an article being measured.

BACKGROUND OF THE INVENTION

The process of making a measurement and marking an article according to the measurement can be time consuming and can be subject to inaccuracies. The present invention is aimed at improving both efficiency and accuracy of measurement and marking.

BACKGROUND ART

A number of patents have described markers associated with measuring instruments. U.S. Pat. No. 1,529,293 to Beulwitz discloses a protractor in which a paper is pricked when a knob is depressed, pushing a pin into the paper. U.S. Pat. No. 2,575,354 to Mills discloses a flexible measuring tape and case, having a scriber point which is exposed in a scribing position only when the tape is locked by rotating the case. The surface being measured may be marked with the scriber point by sliding the case laterally for a short distance on the surface while the tape is locked. U.S. Pat. No. 2,624,120 to Mills discloses a measuring device having an improved case with cooperating locking means for a tape and scribing means characterized by exposure of the scribing means in a scribing position only when the tape is locked and characterized by automatic withdrawal of the scribing means into a non-exposed, non-scribing position during the time the tape is not locked. The work is marked by moving the entire case a short distance sideways while the scriber point is in contact with the work. U.S. Pat. No. 2,649,787 to Kobayashi discloses a scratch marker attached below the point where a tape measure exits its case. U.S. Pat. Nos. 2,807,886 and 3,148,455 to Aciego disclose pencil and tape holders that clamp onto a tape measure case and allow marking with an inserted pencil. U.S. Pat. No. 3,063,157 to Keene discloses a marker that attaches to a tape measure case and that may be folded up into a slot at the back of the case when not in use. U.S. Pat. No. 3,262,211 to Beckett discloses a marking device attached to a folding measuring tape or to a tape measure case. U.S. Pat. No. 3,336,678 to Chamberlain et al. discloses a marking attachment for a coiled measuring tape, which attaches to the tape measure case like a C-clamp and has a spring-loaded pin with a marking point at its lower end. U.S. Pat. No. 3,731,389 to King discloses a tape measuring device with a spring-loaded marking mechanism within the casing at the end opposite the end at which the tape is withdrawn. Markings on the tape are read through a window and are arranged to correspond to the distance between the marking element and the free end of the tape.

U.S. Pat. No. 3,802,083 to Freed shows a marker and stop accessory for extensible measuring tapes, which is mounted on the tape casing adjacent to the tape-issuing opening. A spring-mounted marking element is depressed to mark the article being measured, and a pointer engages the tape to indicate the length of issued tape as well as to arrest any further movement of the tape. U.S. Pat. No. 3,885,314 to Banas, Sr. discloses a two-way tape and centering device with two measuring tapes extensible in opposite directions, located in separate compartments of a single housing. An inscribing device projects through the housing between the two tape measures. A spring maintains the inscribing device in a raised position with the tip enclosed in the housing until the shaft is depressed to make a mark. U.S. Pat. No. 4,015,337 to Taylor shows a combined tape measure and marking device with a spring-loaded arm pivotally supported from one side of the tape measure housing. The forward end of the arm supports an alignment arrow and marking device. The marking device is manually actuated after the alignment arrow is aligned with the desired graduation. When the arm is released, the arm automatically assumes a position in which the marking device is out of contact with the measured article, and the marking quill retracts to a concealed position where it will not further mark the article measured. U.S. Pat. No. 4,296,554 to Hammerstrom discloses a tape measure with a spring clip for attaching the tape to a belt of clothing and also for receiving and positioning a pencil or scribing tool, aligned precisely with the point of exit of the tape from the housing. U.S. Pat. No. 4,439,927 to Elliott shows a tape measure with a casing which also contains a consumable marker and a scriber disposed immediately forward of and alongside the slot through which the coiled tape is withdrawn. Either the marker or scriber may be positioned via manual actuating means to mark an object being measured. A brake is automatically activated when either the marker or the scriber is positioned for marking. The brake can also be activated without marking. A plurality of feed segments compensate for diminishing length of the marker with use.

U.S. Pat. No. 4,542,589 to Yamamoto discloses a marker which may be contained in a tape measure case, mounted on the side, or mounted on the top of the case. In use, the marker is projected to mark a desired point on the surface to be measured. In one embodiment this is accomplished by tilting the tape measure case about one of its corners. U.S. Pat. No. 4,630,376 to Pentecost shows an internally-mounted marking device for a tape measure with a spring-loaded member allowing the user to mark the surface of a workpiece immediately beneath the tape measure. U.S. Pat. No. 4,965,941 to Agostinacci discloses a combination marker and tape measure having a pair of markers which may be used to mark a surface on each side of a flexible tape. A plunger knob is depressed into a recess formed on a declining front face of the housing to move the markers between a retracted configuration and an extended configuration. A locking mechanism formed on a plunger permits selective locking of the tape. A guide foot removably mounted on an end tab enables marking of a line parallel to an edge of a surface. U.S. Pat. No. 5,020,235 to Martin shows a layout device for locating a wall-mounted item at a specified distance from a reference point such as a floor. The device includes a bracket which is removably mounted to a measuring tape. A level attached to the bracket indicates vertical alignment of both the extended tape and the item which is to be installed. The bracket includes protrusions which form indentations marking the measured location when the bracket is forced against the wall surface.

U.S. Pat. No. 5,416,978 to Kaufman discloses a marking device having a housing with a tape opening and a marker opening. A linkage assembly is movably disposed within the housing such that when a linkage engaging aperture engages the linkage assembly, the linkage assembly engages and moves a marking member through the marker opening.

U.S. Pat. No. 5,435,074 to Holevas et al. discloses a tape measure and marking device having a locking mechanism, disposed on the front side of its housing, adjacent to a marker housing containing a marker. The locking mechanism is linked to the marker and a scribe through a lever arm. When the locking mechanism is pressed down, the lever arm drives the marker outside the marker housing, exposing the tip of the marker. Further movement of the locking mechanism moves it into a locked position whereby the measuring tape is fixed after the user releases the locking mechanism. Thus, in the Holevas et al. device, both locking and marking are actuated by manually operating the locking mechanism.

U.S. Pat. No. 5,477,619 to Kearns shows a tape measure marking attachment that includes a generally cylindrically shaped housing for holding a marking utensil. A mechanism is included integral with the housing for releasably locking the marking utensil within the housing.

PROBLEMS SOLVED BY THE INVENTION

When a carpenter or other worker makes a measurement, there is often a need to reach for a marking pencil or the like to make a mark on an article being measured and then to store the marking implement away for the next use. The operations of measuring, reaching for a marking implement, marking, and storing usually require separate discrete motions and corresponding times. By providing an integrated measurement and marking system, this invention allows measurement and marking to be accomplished in one simple, smooth, uninterrupted motion with consistently high accuracy, thereby eliminating wasted time and reducing marking inaccuracy. By providing a marking mechanism completely independent of any tape-measure locking mechanism, the invention allows marking without locking the measuring element and allows locking the measuring element without marking. An attachment version of the invention provides these improvements for existing measuring instruments.

PURPOSES, OBJECTS, AND ADVANTAGES OF THE INVENTION

Major purposes of the invention include accurate and efficient marking of a surface being measured. A major object of the invention is an integrated measuring and marking system that provides for marking of a measured article at the same time that an article is measured. Another object is a marking device aligned with a measuring device. A related object is a marking device whose alignment with a measuring device is adjustable. Another important object is an integrated system whose marking function is activated by moving its housing. A particular related object is an integrated measuring and marking system whose marking function is actuated by moving its housing with respect to the surface of an article being measured. An object related to the accuracy of such a device is a system whose marking action is actuated by moving its housing perpendicularly with respect to the surface. Another object is an integrated measuring and marking system including a cursor for indicating position. Yet another object is a measuring and marking system that is independent of a measure-locking function and is operable without a mechanism for locking. A further object is a measuring and marking system with improved consistency in both alignment accuracy and marking precision. Another object is an integrated measuring and marking system including a marking device that is easily replaceable by a user. A related object is an integrated measuring system adaptable for marking various materials using various marking methods and various marking devices. More specific objects include an integrated marking tape measure, and a marking attachment for a conventional tape measure, a conventional protractor, a conventional "speed square" or the like.

DISCLOSURE OF THE INVENTION

Two general types of measuring and marking systems are disclosed: an integrated measuring and marking system, and a marking attachment for an existing or modified measuring device. The integrated version is described first.

Integrated Version

An integrated measuring and marking system includes a housing, a measuring element (typically an extensible measuring tape retractably coiled within the housing), and a marking element. This measuring element is wholly or partially contained within the housing. A cursor is preferably attached to the housing to indicate a position with respect to the marking element. The cursor may include a magnifier. A marking element for marking the surface of the item to be measured is connected to a support connected to the upper portion of the housing and aligned with the cursor, but the marking element is kept spaced from the surface until the housing is moved with respect to the surface by the user, to mark the surface. The direction of motion of the housing that actuates the marking is preferably perpendicular to the surface being measured, i.e. the user preferably exerts a force downward on the housing, perpendicularly toward the surface. The marking element part of the system is preferably removable and/or replaceable, with or without a cursor. The marking element may include a quantity of marking material, such as ink, pencil lead (graphite), chalk, dye, light-sensitive material, soapstone, crayon, wax (colored or uncolored), pigment, paint, or mixtures, compounds, or composites of those materials. Another type of marking element is an indentor, such as a hard metal point for making an indentation mark in a relatively softer material. Alternatively, the marking element may mark a surface with electromagnetic radiation, such as visible, ultraviolet, or infrared light, or x-rays, when used on a surface sensitive to such radiation. In those cases, the marking element includes a suitable light source, such as a laser. Other alternative embodiments may use a heat source, which may be a laser or electrical resistance element, for example, for marking a surface sensitive to heat. Such a system using electromagnetic radiation or a heat source requires a suitable electrical circuit including a power source and one or more switches. If the power source is a battery, it is preferably a battery having a thin form to fit within the device. Still other marking elements that may be used in the system are pens, sprayers, or ink jets. The pens may be of any type, such as ball-point, felt-tip or fountain pens, depending on the application. Visual or audible feedback may be used to inform the user that a mark is being made on the surface being measured.

The measuring system of this invention may be used for the type of measurement in which a dimension (or angle etc.) is unknown and is to be determined, but it is especially useful for the type of measurement in which a desired dimension is known, and a surface of an article is to be marked at that desired dimension, to prepare the article for a subsequent operation, such as cutting or grinding.

In a typical use of the measuring system, a measuring tape is extended until the cursor is aligned to a desired graduation for the position to be measured, and the housing is depressed toward the surface, where the marking element makes a mark aligned with the cursor and thus with the desired graduation of the measuring tape. Springs, resilient material, or the like move the housing back away from the surface when the housing is released. When not compressed, the springs or resilient material maintain the marking element spaced away from the surface being measured. The marking portion may include a mark-blocking feature, to prevent inadvertent marking. The mark-blocking feature may be released by a release trigger mechanism, for example, to allow marking.

The measurement and marking may both be accomplished in one smooth motion without changing the position of the hand which is holding the housing, as it is the motion of the housing with respect to the surface being measured that actuates the marking. Since no additional steps or finger motions are required to advance or retract the marking element or to engage or disengage a tape-locking mechanism linked to the marking, the measurement process is faster and more efficient than heretofore.

Attachment Version

An attachment version of the invention shares many of the same features as described above in the description of the integrated version, and the attachment version works on the same general principles. Those features common with the integrated version are not repeated here. The attachment may be made for attaching to an existing measuring instrument, with or without modification of the existing measuring instrument. In its most basic form, the attachment version comprises a support that is to be attached to the measuring device, marking means attached to the support, and resilient means for maintaining the marking means in a spaced-apart relationship to the surface to be marked until the support is moved in a direction substantially perpendicular to the surface to contact the surface with the marking material for marking the surface. If the attachment is equipped with a cursor, the cursor is either an integral part of the support or is affixed to the support. The cursor is aligned with the marking means of the attachment so that the cursor indicates where a mark is to be made. Ordinarily, that alignment is built-in to the attachment, and no further alignment by a user is needed. Of course, with some methods of attachment, such as an adhesive, a user may need to align the entire attachment with the existing or modified measuring instrument while installing the attachment. An attachment version may be made with any combination of its elements being disposable and replaceable by a user. The entire attachment may be removed and replaced, or only the marking element, or the combination of marking element and resilient element, or the support, marking element, and means for attaching the support, etc., etc.

BRIEF DESCRIPTION OF THE DRAWINGS

FIGS. 5a–5c show a side elevation view, top plan view, and bottom plan view respectively of a marking attachment made in accordance with the invention.

BEST MODE FOR CARRYING OUT THE INVENTION

In one aspect, the invention is an integrated system for measuring and marking on a surface. The integrated system has a housing, a measuring element at least partially contained within the housing, and a marking element for marking the surface. The integrated system of the present invention is characterized in that the marking element is retained within the housing and is maintained in a spaced-apart relationship to the surface until a user moves the housing in a predetermined direction relative to the surface, whereupon the surface is marked.

The invention will be described primarily in terms of an embodiment made for linear measurements. In this particular embodiment the invention includes a marking apparatus for tape measures. The marking apparatus can be built integrally into a new tape measure or can be implemented as an attachment, to be attached to existing tape measures or the like. It is used to mark articles when they are measured to a predetermined dimension, e.g. a board to be sawed to a specific length. Other embodiments made for angular measurements are also disclosed, as are embodiments made for marking various materials by using various marking devices adapted to the present invention. In the following descriptions, an integrated embodiment is described first; that description is followed by a description of attachment embodiments that attach to existing conventional apparatus, such as tape measures and the like.

Integrated Embodiments

Figure 1:
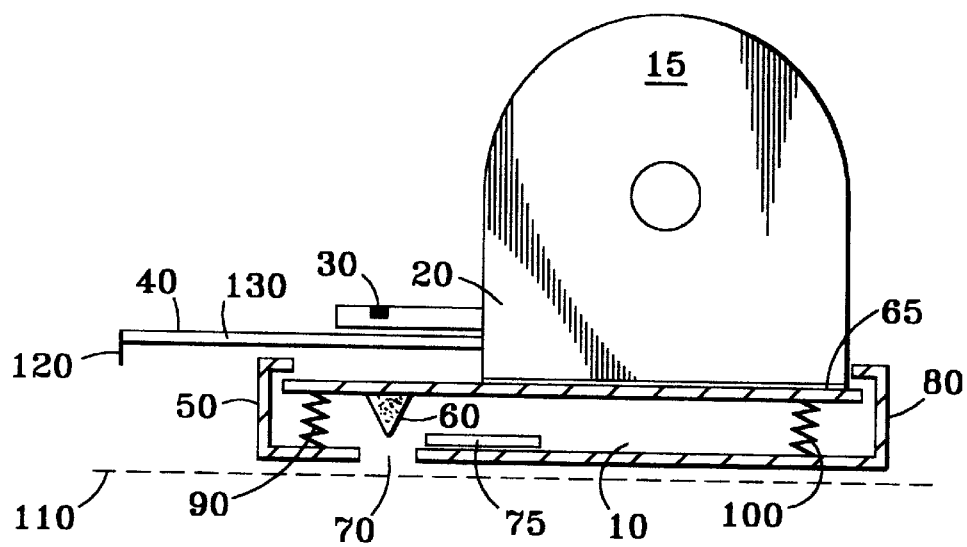
FIG. 1 shows a partially cut away schematic side elevation view of an integrated linear measuring and marking system made in accordance with the invention.

FIG. 1 shows a simple embodiment of an integrated linear measuring and marking system made in accordance with the invention, in a schematic side elevation view, partially cut away to show internal elements.

The marking portion 10 of the integrated system has two sections which are aligned vertically, connected to each other and to the tape measure housing 15. Top section 20 has a cursor 30 extending across the upper face of tape 40 and indicating the position of the tape. Cursor 30 may include, for example, a line engraved or printed on a transparent window formed of any transparent material, or may include one or two cantilevered arrows pointing inward at the edges of the tape. Cursor 30 may also include a magnifier such as a magnifying lens (which may be a Fresnel lens). As is well-known in the measurement art, the function of cursor 30 may also be enhanced in precision by inclusion of a set of conventional vernier indicia (not shown in the drawings). Lower or bottom portion 50 encloses a marking element 60, e.g. a pen or stamp which may be a point or line marker, aligned with cursor 30 and with a hole 70 below it, in a casing 80. Marking element 60 is attached to top section 20 of housing 15. Thus cursor 30 can indicate the position of the tape with respect to the housing 15 for a conventional measuring instrument, but more importantly for the integrated system, the cursor indicates the position of the tape with respect to marking element 60, with which cursor 30 is aligned. The bottom portion 50 has resilient connection means 90 and 100, such as springs, that hold top section 20 up with the marking element 60 away from the surface 110 being measured while the tape is extended to the desired measurement point. Thus bottom portion 50 is movable with respect to top portion 20. When the measurement is made (from the end 120 of tape 40 to cursor 30), the user momentarily applies a force downward on the tape measure housing 15 to mark the surface with marking element 60. The end 120 of tape 40 may include a conventional end hook, which may be of the "true zero" type that slidably compensates for the hook's thickness when used for inside measurements. Hole 70 may be closed by a cover 75 adjacent to the bottom surface, for covering the marking element 60 when it is not being used. Cover 75 may be manually operable, such as a sliding door, or may be normally closed and be arranged to open automatically when housing is depressed, using conventional cams or levers, for example (not shown).

Marking element 60 can be a hard point (e.g. hard steel, silicon carbide, or diamond) for making a dimple-like indentation mark in a surface that is softer than the indenting point. Depending on such variables as the purpose of the measurement and the nature of the surface to be marked, marking element 60 may be any conceivable marking means. For example, if the surface to be marked were a thermoplastic material, a mark could be made by a source of heat, such as an electrical resistance element, a heating lamp, or a laser. If the surface were sensitive to electromagnetic radiation, the marking device could be a source of electromagnetic radiation, such as a semiconductor device, a field-emission device, a light-emitting diode, a laser, a phosphor, a source of visible light, a source of x-rays, a source of ultraviolet light, or a source of infrared light. If the marking element is one of a type that makes a material mark on surface 110, the marking material may be, for example, ink, pencil lead, chalk, dye, light-sensitive material, soapstone, crayon, wax, pigment, paint, or any suitable mixture, compound, or composite of those marking materials. For particular applications, marking element 60 may include, for example, a sprayer such as a paint sprayer, an ink jet such as those used in conventional ink-jet printers, or an ultrasonic vibrator such as those used in ultrasonic drills. For markers that require power for their operation, housing 15 can contain suitable batteries or means for connecting to an external supply of power.

Thus, in general, an integrated form of the invention is an integrated system for measuring and marking on a surface 110, combining a housing 15, some measuring means 40 at least partially contained within housing 15, and a marking element 60 for marking surface 110. The integrated system preferably also includes a cursor 30 attached to housing 15 to indicate a position of measuring means 40 with respect to marking element 60. The marking element 60 is connected to and supported by support 65, which is preferably contained within housing 15, in at least partial alignment with cursor 30. Preferably, marking element 60 is removably attached to housing 15. The alignment of marking element 60 with respect to cursor 30 is preferably made adjustable, but it may be accurately fixed during manufacture of the device. Conventional arrangements for adjusting alignment of one mechanical element with another are well-known in the art and are therefore not shown in the drawings. Marking element 60 is preferably disposed adjacent to the bottom surface of housing 15. Marking element 60 is kept away from surface 110 with an intervening space until housing 15 is moved relative to surface 110, thus marking surface 110 when the marking material of marking element 60 contacts surface 110. The integrated system may include one or more means (such as resilient connection means or, e.g., springs 90 and 100), to maintain the marking element spaced apart from surface 110 until a user moves housing 15 appropriately. In the simple embodiment of FIG. 1, surface 110 is marked when housing 15 is moved (preferably perpendicularly) toward surface 110. However, in other embodiments, a mechanical arrangement using a lever or cam, for example, may be made to impel marking element 60 toward surface 110 for marking it, upon moving the housing in some other manner relative to surface 110. In certain of these arrangements, the lateral position of housing 15 relative to surface 110 is accurately maintained, and parallax is avoided, by actuating the marking function by motion perpendicular to surface 110. Preferably, the marking is not actuated when housing 15 is merely moved away from surface 110, for that direction of motion of the housing would tend to produce unintended marks during incomplete measurements. However, it will be recognized that any of the degrees of freedom of the housing (such as lateral translation, tilting of the housing in roll, pitch, or yaw, etc. or even twisting or squeezing a suitably flexible housing) may be used in various embodiments to actuate the marking process.

Lower portion 50 is retained in approximate alignment to upper portion 20 of housing 15 by conventional mechanical design features. In a simple embodiment, the upper portion 20 has a peripheral groove extending around adjacent to its lower surface, and lower portion 50 has a rim extending inward adjacent to its top edge, the rim being complementary to the groove and engaging the groove to retain the two portions together.

The integrated system also preferably provides a visual and/or audible indication that surface 110 is being marked. Feedback indicating that a mark has been transferred is helpful to the user. A visible indication may be provided by a distinctively colored flag actuated by the marking mechanism, for example, and visible through an opening or transparent window in housing 15. An audible indication that surface 110 is being marked can be provided, for example, by a concave metallic disk actuated by the marking mechanism. The disk makes a clicking sound when its concave and convex sides are mechanically switched. In more complex measurement systems, either the visible or audible indicators or both may be conventional electrically-actuated indicators such as buzzers, loudspeakers, lamps, light-emitting diodes, and the like.

Figure 2:
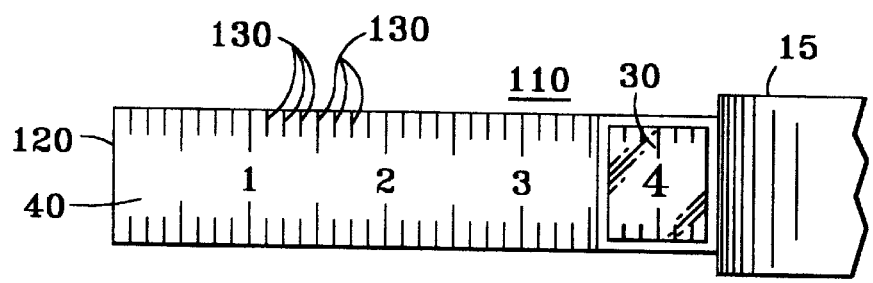
FIG. 2 shows a top partial view of the linear measuring and marking system of FIG. 1, showing details.

If the system is intended for performing a linear measurement, the measuring means 40 includes linear graduations 130 to be read at cursor 30. Such a linear measurement system typically includes a measuring tape or blade retractably coiled within housing 15, as in FIGS. 1, 2, and 4.

Figure 3:
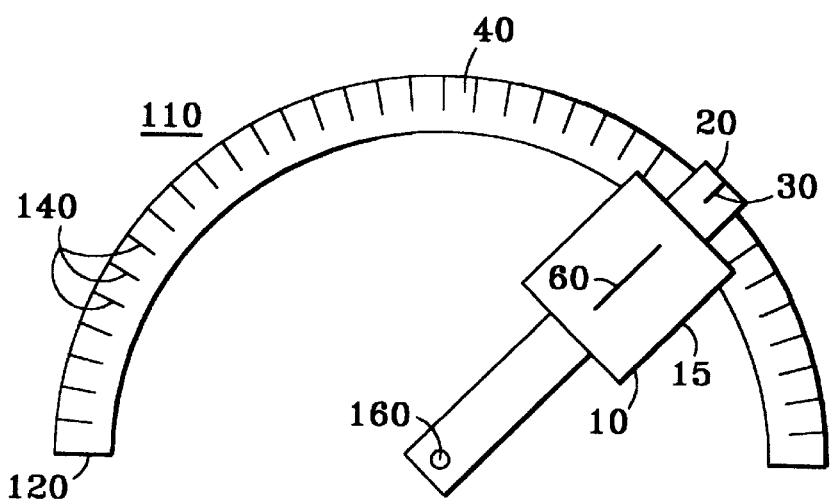
FIG. 3 shows a schematic plan view of an integrated angular measuring and marking system made in accordance with the invention.

If the system is intended for performing an angular measurement, the measuring means 40 includes angular graduations 140 to be read at cursor 30, as shown in FIG. 3. FIG. 3 shows a schematic plan view of an integrated angular measuring and marking system. In such an angular measurement system, the measuring means 40 typically comprises a protractor. In an angle-measuring version of the invention, marking element 60 makes a mark such as a line, indicative of an angle measured about an axis 160 from a reference direction at end 120 of the measuring element 40. It will be apparent that marking element 60 may be outside the protractor arc, instead of inside as shown in the drawing. As in the embodiments for linear measurement, the function of cursor 30 may be enhanced in precision by inclusion of a set of conventional vernier indicia (not shown in the drawings).

Figure 4:
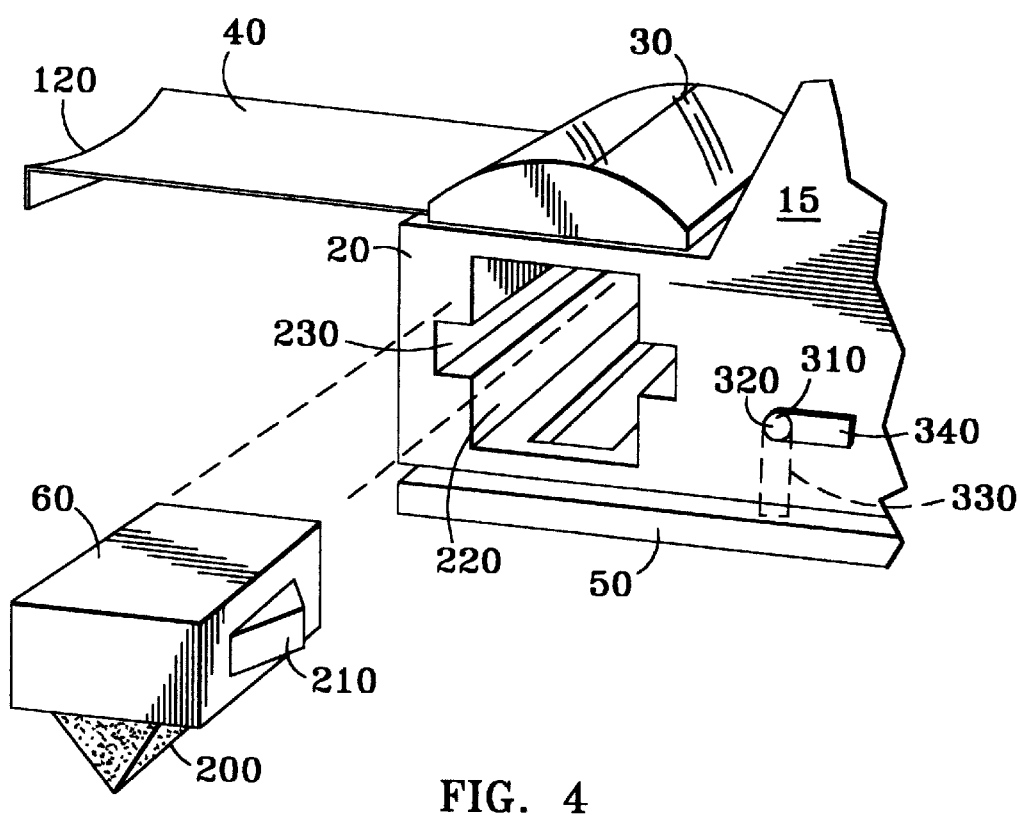
FIG. 4 shows a perspective view illustrating a detail of an embodiment having removable and replaceable modular marking means.

FIG. 4 shows a detail of a preferred embodiment having a removable and replaceable modular marking element.

Many of the marking materials listed herein may be provided in this removable and replaceable modular cartridge form. A modular form of marking element 60, which may be molded of plastic for economical production, holds a marking feature 200 composed of the marking material. Marking element 60 is inserted into an aperture 220 in housing 15. Alignment members 210 on either side of marking element 60 fit through slots 230 in the sides of aperture 220, and engage alignment detents (not shown) inside aperture 220. The alignment detents are of a size and complementary shape to receive alignment members 210. Lower portion 50 of the apparatus has an aperture through which marking feature extends (only when housing 15 is depressed). This aperture in the lower portion 50, aperture 220, and slots 230 are all mutually centered, and aligned with respect to housing 15, in order to provide a mark at the proper location on surface 110. In particular, if there is a cursor 30, these elements are centered on a centerline extending directly downward through the center of cursor 30. While it is convenient to have a snap-in type of cartridge, the marking element may be held by other means, such as a removable pin from the front or side of the housing, passing through the marking element, or may be held by a spring element that is deflected by a user in order to insert or remove the cartridge. Another type of retaining mechanism that is applicable in some designs is the type using a ball bearing in a socket, held in a retaining position by a spring. Aperture 220 may be covered with a cover, such as a sliding door, when the modular marking element is not being changed.

In various alternative embodiments, the removable and replaceable modular marking element may include a user-releasable latching mechanism, (such as a spring-loaded latch molded of plastic similar to the latching tab of an RJ-11 modular telephone jack) and, if needed, a separate tab, lever, or trigger mechanism arranged to release the latching mechanism.

It is often desirable to prevent inadvertent marking. A system that can prevent inadvertent marking preferably includes a mechanism for releasably locking the marking element"up" (i.e. away from surface 110). This mechanism can have a release element for releasing the locking mechanism and allowing the marking element to operate for marking. One embodiment of the locking feature is illustrated in FIG. 4. An L-shaped lever 310 pivots around an axis 320. Inside housing 15, an inner lever arm 330 extends downward next to lower section 50 when lever 310 is in the locked position, preventing upper portion 20 from being depressed. Outside lever arm 340 is moved by a user (e.g. counterclockwise from the locked position illustrated in FIG. 4) to rotate inner lever arm 330 toward a horizontal orientation to unlock the marker. There are many alternate conventional means for locking that may be used, such as the safety used to prevent firing of a gun, or the lock on the power trigger of a power tool. Many such locking mechanisms use levers, slides, or cams moved into and out of a position for interfering with a motion by using a handle, trigger, or buttons.

Taking the tape measure embodiment of FIG. 1 as exemplary of the use of the invention: to use the invention, a user extends the measuring tape 40 from housing 15 until a desired measurement for surface 110 (as measured from tape end 120) is indicated by graduations 130 aligned at cursor 30. The user applies a force to housing 15 to momentarily move the housing relative to surface 110, whereby marking element 60 makes a mark on surface 110. This combined measurement and marking operation may be accomplished in one simple, smooth, uninterrupted motion with consistently high accuracy and repeated as many times as there are measurements to be made. The attachment embodiments, to be described next, are used similarly.

Attachment Embodiments

FIGS. 5a–5c, 6a–6d, and 7a–7b show various embodiments of the invention designed for use as attachments to existing measuring instruments.

A particularly simple embodiment is shown in FIGS. 5a–5c. A marking attachment 10 to an existing measuring device 25 has a support 65, means 66 for attaching the support to the measuring device, a marking element 60 attached to support 65 for marking on a surface 110 (the marking element having a predetermined height), and resilient element 95 whereby the marking element 60 is maintained in a spaced-apart relationship to the surface 110 until the support is moved in a direction substantially perpendicular to the surface sufficiently to contact the surface with the marking element 60 for marking the surface. As in the integrated embodiments of the marking device, if the marking element is one of a type that makes a material mark on surface 110, the marking material may be, for example, ink, pencil lead, chalk, dye, light-sensitive material, soapstone, crayon, wax, pigment, paint, or any suitable mixture, compound, or composite of those marking materials. Marking element 60 is preferably shaped to have a fine-tip marking feature 200. For this attachment embodiment, marking element 60 preferably comprises a quantity of material including an oleate-based pigment ink for marking the surface. Resilient element 95 may be a spring or springs, a quantity of elastomeric material, or anything that has the property of resilience, i.e., of returning substantially to its original form or position after being bent, compressed, or stretched. In the attachment embodiment illustrated in FIGS. 5a–5c, the resilient element 95 for maintaining the marking element in a spaced-apart relationship to the surface 110 preferably comprises a quantity of elastomeric material disposed adjacent to marking element 60, the quantity of elastomeric material having an uncompressed thickness greater than the height of marking element 60. The elastomeric material of resilient element 95 may be a foam type of elastomeric material commonly known as "foam rubber" (even for synthetic elastomers containing no natural rubber), or may be any elastomer having a suitable compressibility such that the resilient element 95 can be compressed until marking element 60 extends at least to the lower surface of the elastomer, and preferably slightly beyond, to contact surface 110 for marking the surface. Resilient element 95 may have an aperture 96 generally surrounding marking element 60 as shown in FIGS. 5a–5c, or may consist of one, two or more pieces disposed alongside marking element 60, e.g., on either side of marking element 60 (not shown). Aperture 96 may be an opening formed in resilient element 95 by various processes such as cutting, punching, notching, etc. In FIG. 5a, the bottom edge of a portion of resilient element 95 is visible at the bottom of aperture 96. With other forms of aperture 96, such as a slot extending across the entire width of resilient element 95, such an edge would not be visible in FIG. 5a.

Just as in the integrated embodiments of the invention, an attachment version may have a cursor 30 at least partially aligned with marking element 60. When the attachment is attached to existing measuring device 25, cursor 30 is at least partially aligned with the existing measuring device. In the case of an attachment, the act of aligning with the existing measuring device is ultimately performed by the user when installing the attachment, but it will be recognized by those skilled in the art that suitably accurate alignment may be achieved by a combination of design of the attachment and proper installation instructions. In the embodiment of FIGS. 5a–5c, cursor 30 is made integral with support 65, so that the alignment of cursor 30 with marking element 60 is accurately fixed during manufacture of the attachment. The position-indicating portion of the cursor may have any suitable form such as a line, arrow(s), arrowhead(s), or triangles. For example, an integral cursor may include a printed line, a groove engraved or molded in the top surface of a transparent support 65, or a cylindrical magnifying lens molded into the top surface support 65, with a printed, molded, or engraved cursor line. If a magnifying lens is included, it may be a discrete lens affixed to support 65, preferably by a transparent adhesive. If existing measuring device 25 has an existing cursor, then the user of the attachment may align marking element 60 with that existing cursor when attaching the attachment.

FIG. 5a shows schematically an optional "lock-out" element 350 formed of a rigid material for constraining the distance that support 65 can be depressed toward the work surface 110. When lock-out 350 is in the position shown, resilient element 95 can be compressed only until element 350 contacts the work surface 110. Lock-out element 350 is shown as an L-shaped part in FIG. 5a, but may be made in any suitable form that can be moved from a first position that allows resilient element 95 to be compressed sufficiently for marking element 60 to mark the work surface 110 to a second position that the limits the compression of resilient element 95 and thus prevents marking of the surface.

Figure 6A:
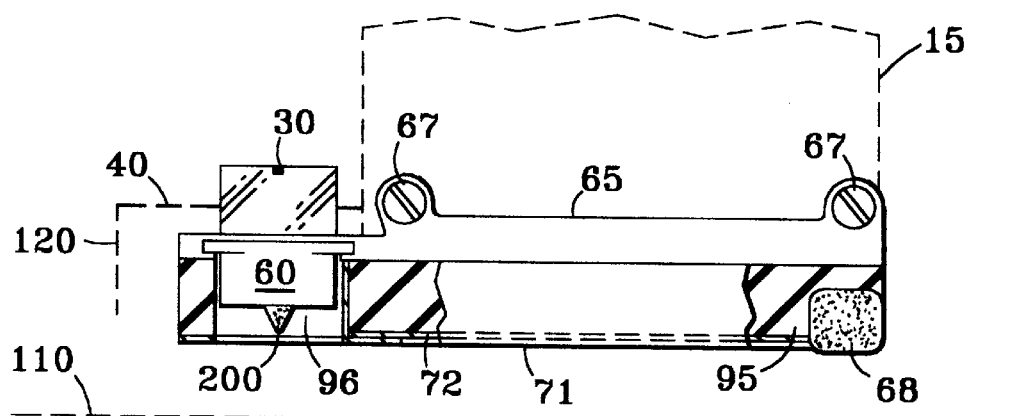
FIGS. 6a–6d show a partially cutaway side elevation view of another marking attachment, an exploded view thereof, and details thereof.
Figure 6B:
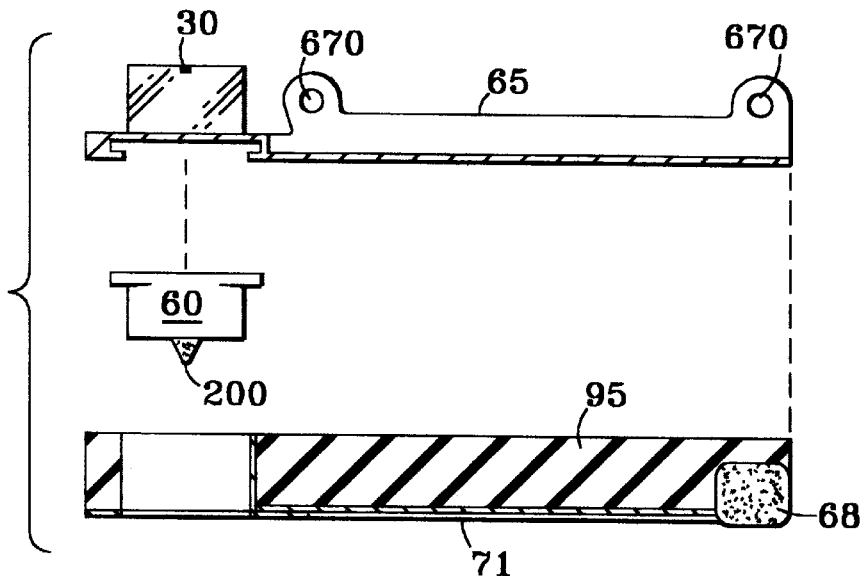

FIGS. 6a–6d show another attachment embodiment of the invention for marking on a surface 110. A marking attachment device for attachment to case 15 of an existing measuring device 25 has a support 65, a marking element 60 attached to support 65, and resilient element 95 for maintaining marking element 60 in a spaced-apart relationship to the surface 110 until the existing device 25 (and therefore the support 65 attached to it) is moved in a direction substantially perpendicular to the surface to contact the surface with the marking element 60 for marking the surface. In FIGS. 6a–6b, support 65 is attached to case 15 by screws 67 inserted through holes 670 and fitting into existing threaded holes in case 15 of existing measuring device 25. Thus screws 67 provide means for attaching support 65 to the measuring device, but various other means may be used for attaching support 65. Some of the alternative attachment methods for attaching support 65 to the measuring device may comprise means for removably attaching the support. Alternative attachment methods include other suitable fasteners such as rivets or pins, adhesives such as glue, adhesive tape (including tape having adhesive on both sides), magnets used with ferrous elements, hook-and-loop fasteners (e.g., Velcro™ fasteners), clips, dimple detents mating with raised bumps, grooves mating with raised rails, etc. Such rails, bumps, grooves, or dimples may be discrete elements fastened to the case or support, or they may be formed in the support or the case of the measuring device. Such alternate means for attachment, considered by themselves, are conventional means known in the art and are therefore not shown explicitly in the drawings.

Resilient element 95, for maintaining marking element 60 in a spaced-apart relationship to the surface, preferably comprises a quantity of elastomeric material disposed adjacent to marking element 60, the quantity of elastomeric material again having an uncompressed thickness greater than the height of marking element 60. Again, the quantity of elastomeric material may be disposed to substantially surround marking element 60. Resilient element 95 for maintaining the marking element in a spaced-apart relationship to the surface, like resilient connection means 90 and 100 shown schematically in FIG. 1, may comprise one or more springs. As shown in FIGS. 6a and 6b, resilient member 95 may have a relatively stiffer, more rigid protective base 71 provided by a base layer, such as a thin layer of rigid or semi-rigid plastic affixed to resilient member 95. Protective base layer 71 protects resilient member 95 from excessive wear. Thus this protective base layer 71 provides a layer of material relatively harder than resilient element 95, protective layer 71 being disposed adjacent to resilient member 95 to prevent direct contact of resilient member 95 with the work surface for preventing excessive wear of resilient element 95. Alternatively, resilient member 95 may consist of a material of gradated resilience, or a composite of layers of various resiliences (not shown in the drawings) that together provide a gradated resilience, preferably with the least resilient layer at the position of protective base layer 71.

As in the integrated embodiments of the invention, an attachment version may have releasable means for locking the marking element to prevent inadvertent marking, such as the mechanism illustrated in FIG. 4 by lever 310 and associated elements 320–340 or the various alternatives mentioned above in connection with integral embodiments of the invention.

In FIGS. 6a–6d, marking element 60 may be similar to that of FIGS. 5a–5c, preferably comprising a quantity of material including an ink. Many inks exist today or may be developed in the future that are suitable for the present invention when it is used for various purposes. An important field of application of the present invention is the marking of wooden work surfaces. For use with work surfaces 110 of wood, the ink of marking element 60 must be an ink which does not run or bleed when applied to wood. For all applications, a suitable ink will also be resistant to drying out in air while marking element 60 is not in use. A particularly preferred ink that is suitable for use on wood and other materials is a pigment ink containing a pulverized substance such as carbon black as coloring matter, suspended in a liquid vehicle. It is preferably an oleate-based ink.

FIG. 6a shows an eraser 68, disposed at the bottom of resilient member 95 (i.e., the surface normally adjacent to work surface 110) to provide a capability of erasing a mark made with marking element 60 and optionally attached to support 65, base 71, or preferably to resilient element 95 as shown in FIG. 6a. Eraser 68 is made of a conventional eraser material with suitable properties such as abrasiveness, color, adhesion to mark material, etc., in order to erase, lift-off, or "white-out" the marks made by marking element 60. When erasure of a mark is desired, the user rubs the mark with eraser 68, for example.

Figure 6C:
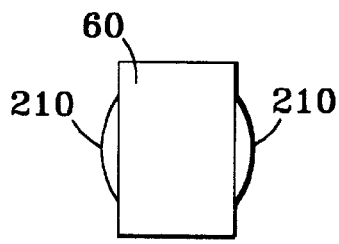

It will be apparent that a modular form of marking element 60 such as the form shown in FIG. 4 may be combined with an attachment embodiment such as that shown in FIGS. 6a–6d. Marking element 60 is preferably shaped to have a marking feature 200. A marking feature 200 composed of the marking material may have any desired form, such as a fine conical point, a fine linear edge, an arrow or arrowhead form for stamping an image of an arrow or arrowhead on the work surface 110, etc. Marking element 60 may comprise a disposable marking element removably attached to support 65. As shown in FIG. 6c, marking element 60 may have alignment members 210, similar to those shown in FIG. 4.

Figure 6D:
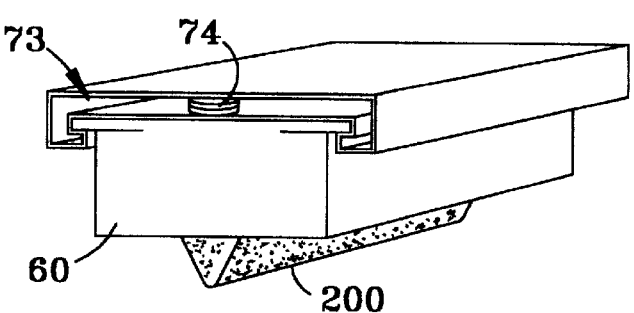

FIG. 6d illustrates a feature for preventing excessive pressure on marking feature 200 of marking element 60. A flexible intermediate structure 73 disposed between marking element 60 and support 65 has a resilient element 74 such as a spring, which is compressed when marking feature 200 presses against work surface 110, thus preventing marking feature 200 from being distorted by excessive pressure.

Figure 7A:
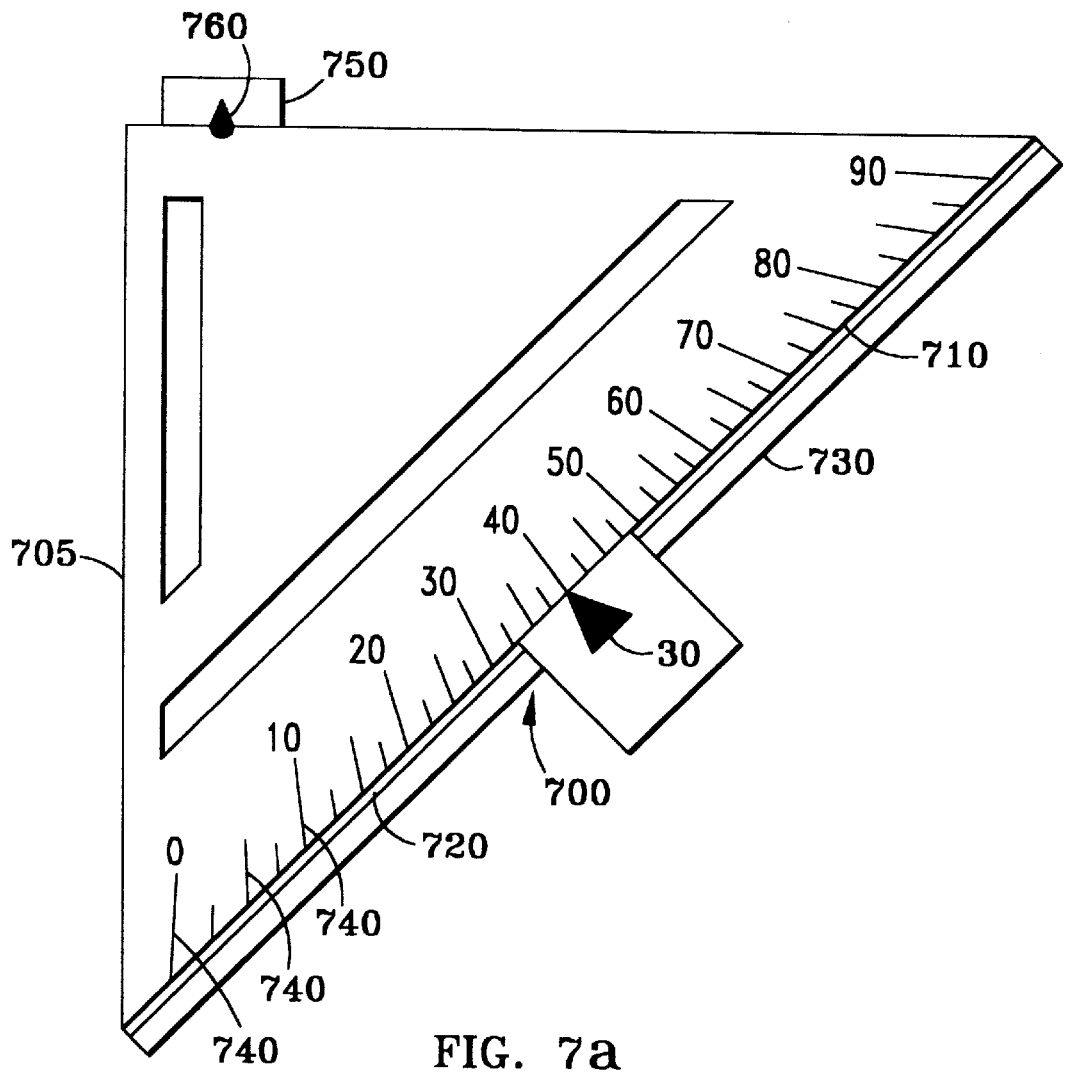
FIGS. 7a–7b show a plan view of another marking attachment and cross-section elevation details thereof respectively.
Figure 7B:
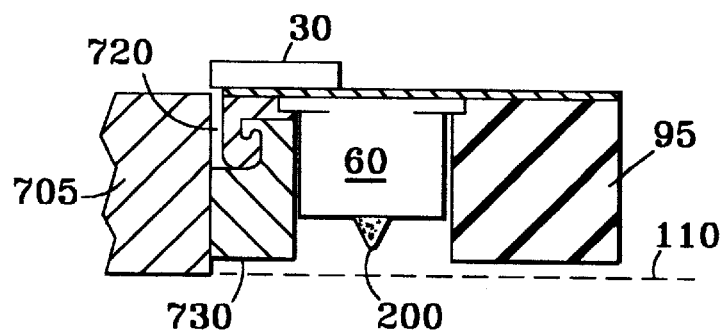

FIGS. 7a–7b show an embodiment 700 that is intended for use as an attachment to a speed square 705, such as one of the types available from the Swanson Tool Co., Inc. of Frankfort, Ill. or the type described in U.S. Pat. No. 4,513, 510 to Swanson, for example. The attachment slides along edge 710 of the speed square, riding in groove 720 formed by edge 710 and rail 730, as shown in FIG. 7b. (FIG. 7b is a cross-sectional elevation view as seen from a direction parallel to edge 710.) It should be noted that the graduations 740 in FIG. 7a form various angles with the edge of the speed square, i.e., they are not all perpendicular to the edge 710 as they would normally be on a tape measure or simple try square, for example. The marking feature 200 of marking element 60 in the embodiment for a speed square should be a point, e.g., as provided by a conical shaped marking element 60, to provide for proper alignment with the graduations regardless of their angles with the edge of the speed square, and marking feature 200 should be disposed adjacent to graduations 740 to avoid parallax. A separate marking attachment 750 may be attached to pivot point 760 as well.

Thus, in general, a form of the invention for marking on a surface 110 (intended as an attachment to a conventional measuring instrument having a housing 15 and some measuring means 40 at least partially contained within housing 15) has a marking element 60 for marking surface 110. The attachment system preferably also includes a cursor 30 at least partially aligned with marking element 60 to indicate a position of measuring means 40 with respect to marking element 60. The marking element 60 is connected to and supported by support 65, which is intended to be attached to housing 15 at a position providing at least partial alignment with cursor 30. Preferably, marking element 60 is removably attached to support 65. The alignment of marking element 60 with respect to cursor 30 is normally fixed in the attachment form of the invention, and the attachment is attached with cursor 30 aligned to housing 15. Marking element 60 is preferably disposed adjacent to the bottom surface of housing 15. Marking element 60 is kept away from surface 110 by resilient element 95 until housing 15 is moved relative to surface 110, thus marking surface 110 when marking element 60 contacts surface 110. The attachable system includes one or more resilient elements 95 to maintain the marking element spaced apart from surface 110 until a user moves housing 15 appropriately. In the simple embodiment of FIGS. 5a–5c, marking element 60 has a predetermined height, and resilient element 95 has an uncompressed thickness greater than the predetermined height of marking element 60. Thus, in the embodiment of FIGS. 5a–5c, surface 110 is marked by marking element 60 when housing 15 (and thus support 65 attached to it) is moved substantially perpendicularly toward surface 110, thereby compressing resilient element 95 between support 65 and surface 110 and thus thinning resilient element 95 to a compressed thickness about equal to the predetermined height of marking element 60. When resilient element is compressed sufficiently, surface 110 is marked by marking element 60.

The attachment version may be made with any combination of its elements being disposable and replaceable by a user. The entire attachment may be removed and replaced, or just the marking element 60, or the combination of marking element 60 and resilient element 95, or the combination of support 65, marking element 60, and means 66 for attaching the support, or any desired combination.

INDUSTRIAL APPLICABILITY

Both the integrated measuring and marking system and the attachment form of this invention have many uses, including simultaneous measuring and marking of surfaces, particularly according to linear and angular measurements made to mark a surface for a subsequent operation, such as cutting. Either the integrated system or the attachment may be used in various fields of endeavor, such as carpentry, machining, sewing or tailoring of garments, etc.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. For example, graduations of the measuring means may comprise sinusoidal or other periodic optical or magnetic signals on a suitable tape, or marking may be achieved by a magnetic tape recording head, a rotating knife or saw blade, etc. For another example, the housing of the invention may be made in one piece if at least a portion of the housing is flexible enough to allow a user to depress the top portion containing the measuring and marking elements relative to the bottom portion. In an attachment for existing measuring instruments, a resilient element may consist of a multiplicity of individual resilient elements not necessarily connected to each other and not necessarily all having the same degree of resiliency. Many other embodiments of the invention will be apparent to those skilled in the art from a consideration of this specification or from practice of the invention disclosed herein. It is intended that the specification and examples be considered as exemplary only, with the true scope and spirit of the invention being defined by the following claims.

Having described our invention, we claim:

1. A marking device for attachment to an existing measuring device having a housing and for marking on a surface, said marking device comprising:

a) a support adapted for attachment to said housing and being disposed between said housing and said surface;

b) marking means attached to said support, said marking means comprising a quantity of marking material; and c) resilient means for maintaining said marking means in a spaced-apart relationship to said surface until said support is moved in a direction substantially perpendicular to said surface sufficiently to contact said surface with said marking material of said marking means for marking said surface.

2. A marking device as in claim 1, further comprising means for attaching said support to said measuring device.

3. A marking device as in claim 2, wherein said means for attaching said support to said measuring device comprises an adhesive.

4. A marking device as in claim 3, wherein said adhesive comprises glue.

5. A marking device as in claim 2, wherein said means for attaching said support to said measuring device comprises adhesive tape.

6. A marking device as in claim 5, wherein said adhesive tape comprises double-sided-adhesive tape having adhesive on a first side for adhering to said measuring device and having adhesive on a second side for adhering to said support.

7. A marking device as in claim 2, wherein said means for attaching said support to said measuring device comprises hook-and-loop fasteners.

8. A marking device as in claim 2, wherein said means for attaching said support to said measuring device comprises means for removably attaching said support.

9. A marking device as in claim 2, wherein said means for attaching said support to said measuring device comprises at least one magnet.

10. A marking device as in claim 2, wherein said means for attaching said support to said measuring device comprises at least one screw.

11. A marking device as in claim 2, wherein said means for attaching said support to said measuring device comprises at least one rivet.

12. A marking device as in claim 2, wherein said means for attaching said support to said measuring device comprises at least one pin.

13. A marking device as in claim 2, wherein said measuring device has a case of a type having detents formed therein and said means for attaching said support to said measuring device is adapted to engage said detents formed in said case of said measuring device.

14. A marking device as in claim 2, wherein said measuring device has a case of a type having grooves formed therein and said means for attaching said support to said measuring device is adapted to engage said grooves formed in said case of said measuring device.

15. A marking device as in claim 2, wherein said measuring device has a case of a type having rails and said means for attaching said support to said measuring device is adapted to engage said rails of said case of said measuring device.

16. A marking device as in claim 1, further comprising an eraser disposed adjacent to said resilient means for maintaining said marking means in a spaced-apart relationship to said surface, for erasing marks made by said marking means.

17. A marking device as in claim 1, wherein said resilient means for maintaining said marking means in a spaced-apart relationship to said surface comprises a quantity of elastomeric material disposed adjacent to said marking means.

18. A marking device as in claim 17, wherein said resilient means for maintaining said marking means in a spaced-apart relationship to said surface further comprises a protective layer of material relatively harder than said elastomeric material, said protective layer being disposed adjacent to said elastomeric material to prevent direct contact of said elastomeric material with said surface for preventing excessive wear of said elastomeric material.

19. A marking device as in claim 17, wherein said quantity of elastomeric material has an uncompressed thickness and said marking means has a predetermined height, said uncompressed thickness being greater than said predetermined height of said marking means.

20. A marking device as in claim 17, wherein said quantity of elastomeric material is disposed adjacent to more than one side of said marking means to at least partially surround said marking means.

21. A marking device as in claim 1, wherein said resilient means for maintaining said marking means in a spaced-apart relationship to said surface comprises at least one spring.

22. A marking device as in claim 1, further comprising a cursor at least partially aligned with said measuring device.

23. A marking device as in claim 1, further comprising releasable means for locking said marking means to prevent inadvertent marking.

24. A marking device as in claim 1, wherein said marking means comprises a quantity of material selected from the list consisting of ink, pencil lead (graphite), chalk, dye, light-sensitive material, soapstone, crayon, wax (colored or uncolored), pigment, paint, or mixtures, compounds, or composites of those materials.

25. A marking device as in claim 1, wherein said marking means comprises a quantity of material including an ink.

26. A marking device as in claim 25, wherein said ink comprises a pigment ink.

27. A marking device as in claim 25, wherein said ink comprises an oleate-based ink.

28. A marking device as in claim 1, wherein said marking means comprises a disposable marking element removably attached to said support.

29. A marking device as in claim 1, wherein said marking device comprises a disposable combination of removable and disposable elements selected from a disposable support, a disposable marking element, and a disposable resilient means for maintaining said marking means in a spaced-apart relationship to said surface.

30. A marking device as in claim 1, wherein said marking means comprises a marking element attached to said support, said marking element comprising a quantity of marking material disposed to mark said surface when said support is moved in a direction substantially perpendicular to said surface, said quantity of marking material including an oleate-based pigment ink for marking said surface when said marking material contacts said surface.

31. A marking device for attachment to an existing measuring device having a housing and for marking on a surface, said marking device comprising:
 a) a support adapted for being disposed between said housing and said surface;
 b) means for attaching said support to said housing of said measuring device while disposed between said housing and said surface;
 c) marking means attached to said support, said marking means having a predetermined height and including a marking material; and
 d) a quantity of elastomeric material disposed adjacent to said marking means, said quantity of elastomeric material having an uncompressed thickness greater than said predetermined height of said marking means, whereby said marking means is maintained in a spaced-apart relationship to said surface until said support is moved in a direction substantially perpendicular to said surface sufficiently to contact said surface with said marking material of said marking means for marking said surface.

32. A marking device as in claim 31, wherein said marking means comprises a quantity of material including an oleate-based pigment ink for marking said surface.

33. A marking device for attachment to an existing speed square device having an edge and for marking on a surface, said marking device comprising:
 a) a rail disposed for affixing said marking device to said existing speed square device along said edge of said existing speed square device, said rail being further disposed to form a groove adjacent to said edge and parallel to said edge;
 b) a support adapted to slide along said groove;
 c) marking means attached to said support, said marking means comprising a marking material; and
 d) resilient means for maintaining said marking means in a spaced-apart relationship to said surface until said support is moved in a direction substantially perpendicular to said surface sufficiently to contact said surface with said marking material of said marking means for marking said surface.

* * * * *